Figure 3:
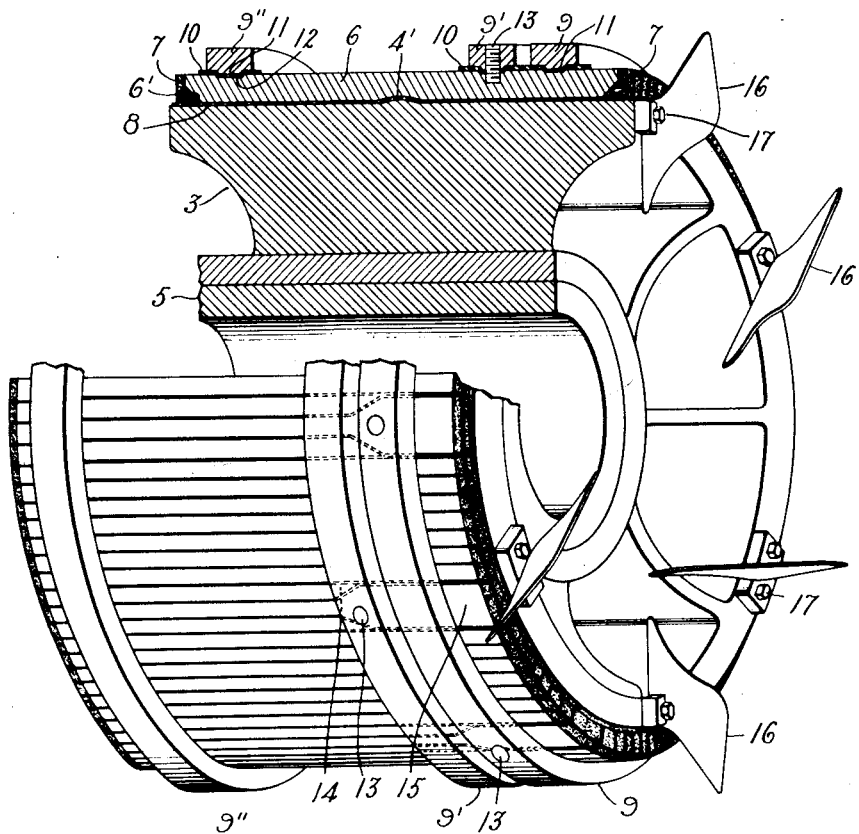

W. F. DAWSON.
DYNAMO ELECTRIC MACHINE.
APPLICATION FILED DEC. 19, 1904.
998,677.
Patented July 25, 1911.
2 SHEETS—SHEET 1.
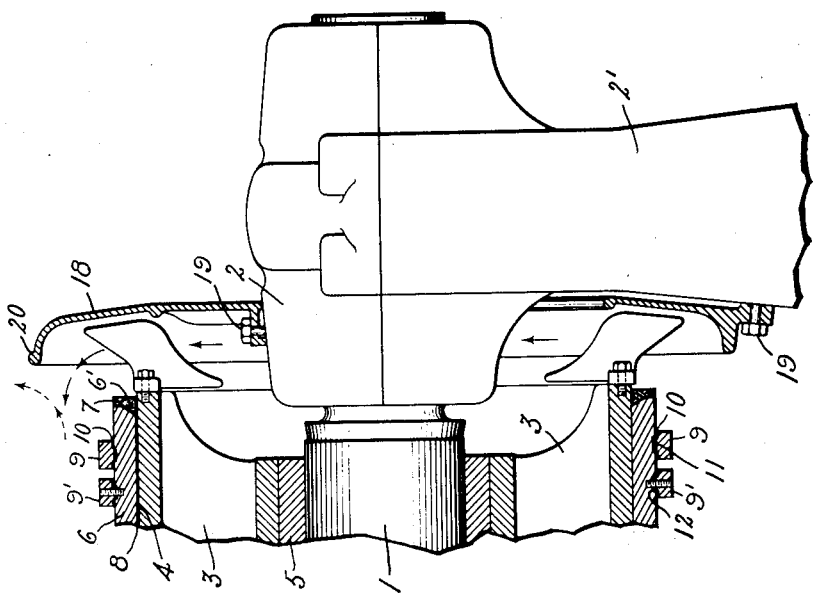
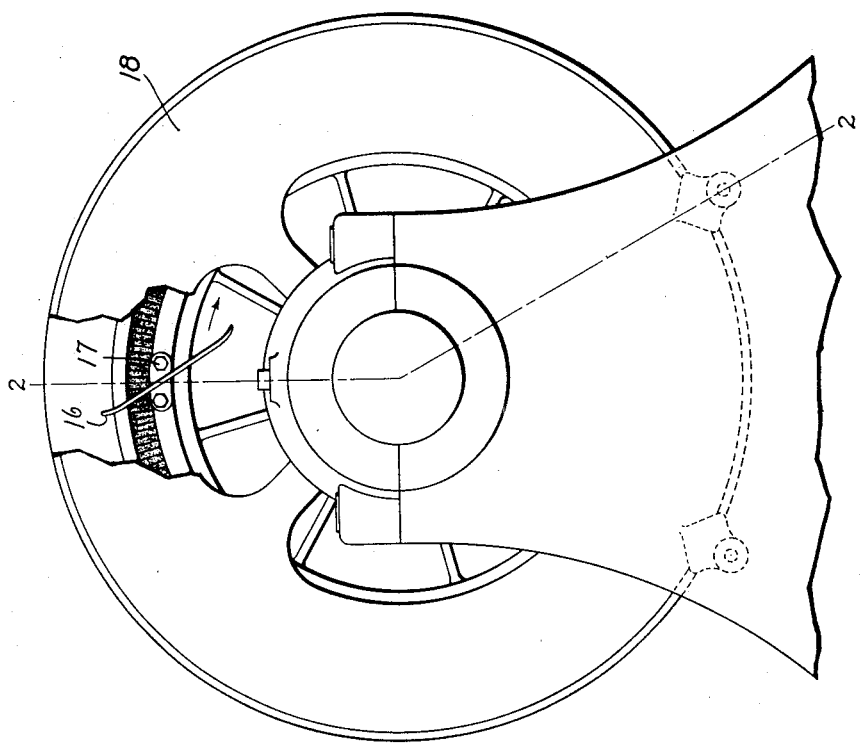
Witnesses:
George H. Tilden.
Helen Oxford
Inventor:
William F. Dawson,
by Albert G. Davis
Att'y.

W. F. DAWSON.
DYNAMO ELECTRIC MACHINE.
APPLICATION FILED DEC. 19, 1904.

998,677.

Patented July 25, 1911.

Witnesses:
George H. Tilden.
Fred Oxford

Inventor:
William F. Dawson,
by Albert G. Davis
Att'y.

UNITED STATES PATENT OFFICE.

WILLIAM F. DAWSON, OF SCHENECTADY, NEW YORK, ASSIGNOR TO GENERAL ELECTRIC COMPANY, A CORPORATION OF NEW YORK.

DYNAMO-ELECTRIC MACHINE.

998,677.            Specification of Letters Patent.     Patented July 25, 1911.

Application filed December 19, 1904. Serial No. 237,370.

*To all whom it may concern:*

Be it known that I, WILLIAM F. DAWSON, a citizen of the United States, residing at Schenectady, county of Schenectady, State of New York, have invented certain new and useful Improvements in Dynamo-Electric Machines, of which the following is a specification.

My present invention has for one of its objects the production of a simple but reliable commutator construction particularly adapted for withstanding the centrifugal forces developed at high speeds.

Another object of my present invention is the combination in a commutator construction of collector rings for alternating current connections.

The various features of novelty which characterize my invention are pointed out with particularity in the claims annexed to and forming a part of this specification. For a better understanding of my invention, however, reference may be had to the accompanying drawings and description in which I have illustrated one embodiment of my invention.

Of the drawings, Figure 1 is an end elevation with parts broken away and in section showing a portion of a dynamo electric machine constructed in accordance with my invention; Fig. 2 is a partial section taken on the line 2 2 of Fig. 1; and Fig. 3 is a perspective view with parts broken away and in section showing my improved construction.

Referring to the drawings, 1 represents the shaft of a dynamo electric machine, one end of which is journaled in a suitable bearing box 2 supported by a pillow block 2′. A member 3, the outer surface 4 of which is cylindrical is secured to the shaft 1. In the form of construction illustrated, a sleeve 5, which may also support the armature, not shown, is placed between the member 3 and the shaft 1. A series of commutator bars 6, each placed parallel to the axis of the shaft 1, are disposed about the cylindrical surface of the member 4 in the usual manner, adjacent parts being insulated from each other by strips 7 of insulating material, and from the member 3 by a layer of insulating material 8. The bars 6 are secured in position by metal clamping rings 9, 9′ and 9″ which surround the bars and are insulated from them by insulating material 10. Preferably the rings 9 are expanded by heat before placing them about the bars, so that when the rings cool they will shrink and firmly lock the bars in position on the member 3.

As shown a circumferentially extending tongue or rib 11 is formed on the inner periphery of each clamping ring. The commutator bars are each formed with a corresponding notch or depression 12. When the rings are shrunk into position the insulating material, which serves to electrically separate the bars from the clamping rings by its flexibility, allows the clamping rings and bars to be virtually interlocked. A sufficient number of clamping rings are placed on the commutator bars to hold them firmly in position and to prevent their distortion under the stresses produced by operating conditions. Frequently a pair of rings placed one at each end of the commutator bars are sufficient to hold the bars in place. Under some conditions, however, I prefer to use more than two clamping rings. In any event, the space between the rings should be sufficient to permit the use of a sufficient number of brushes in engagement with the commutator bars. Suitable connections are made between the commutator bars and the winding of the armature (not shown in the drawings) in the usual manner.

As is clearly shown in the drawings, the ends of the commutator bars are undercut as indicated at 6′. The insulating strips 7, which are not under-cut, extend beyond the ends of the bars and form a means for firmly holding the projecting end of the insulating material 8 against the surface 4. By under-cutting the ends of the commutator bars as indicated at 6′ an ample leakage distance between the ends of the commutator bars and the commutator shell 3 is obtained and the liabilty of breakdown of the insulation at the end of the commutator bars is materially reduced. In order to prevent the accumulation of dirt in the space between the projecting ends of the insulating strip 7, such space may be filled with some adhesive insulating material. In order to prevent longitudinal movement of the commutator bars with respect to the supporting member 3, I sometimes form a ridge or projection 4′ extending circumferentially about the supporting member 3 and form notches in the commutator bars to fit the ridge 4'. This construction is particularly useful with vertical shaft machines.

When it is desired to make alternating current connections with the windings of the armature in addition to the ordinary connections by way of the commutator bars, I electrically connect two or more of the clamping rings to suitable commutator bars. For instance, in the construction shown in the drawing, where the armature winding to which the commutator is connected is designed to be used with a 12-pole field magnet and comprises twelve portions in parallel, connections are made from the right hand ring 9 to six equally distant commutator bars. An equal number of connections is made from the adjacent ring 9' to six commutator bars which are located midway between the commutator bars to which the right hand ring is connected. With this construction, when the machine of which the commutator forms a part is used as a generator, it will be readily understood that single-phase alternating current can be collected from the rings 9 and 9' in the usual manner, while at the same time direct current may, if desired, be taken from the commutator bars in the usual manner.

In the construction illustrated, the connections between rings 9 and 9' and the proper commutator bars 6 are made by threaded rods 13 which are screwed through suitable openings formed in the rings into threaded openings formed in the bars. In some cases I may widen the ends of the bars to which connections are made as indicated at 15 in order to get the proper strength of connection. In such cases I shorten the adjacent commutator bars as indicated at 14.

In order to limit the heating of commutators or collector rings I may secure fan blades in juxtaposition to them, as shown for instance in the drawings where fan blades 16 are secured to the end of the member 3 by bolts 17 which are tapped into the member. Each fan blade 16 is double-ended and is supported in the middle by the bolts 17, so that the fan blades extend both outwardly and inwardly from the periphery of the commutator. It will be readily understood that the revolution of the armature shaft will cause these fans to generate air currents. In order that the air currents generated by the fan blade 16 may be forced axially over the surface of the heated contact conductors, whether commutator bars, collector rings, or both, I employ a deflector or shield 18 which, in the construction shown in Figs. 1 and 2, is secured to the bearing box 2 and to the pillow block 2' by bolts 19. The shield 18 which is substantially circular in outline is dish shaped and is arranged with its outer edge 20 projecting over the fan blades 16. It will be readily understood that the shield shaped as shown will deflect the air currents generated by the fan blades axially along the surface of the contact conductors in the direction indicated by the full line arrows shown in Fig. 2.

In some cases I prefer to omit the shield 18. When the shield 18 is omitted the air currents generated by the direct action of the fan blades flow radially out from the end of the commutator. The currents directly generated by the fan blades, however, create induced currents which flow in the directions indicated by the dotted line arrows in Fig. 2 of the drawings. The induced currents serve to cool the surface of the commutator.

While I have hereinbefore described and illustrated the best form of my invention now known to me it will be readily understood by those skilled in the art that changes can be made in the form in which my invention is embodied without departing from the spirit of my invention.

What I claim as new and desire to secure by Letters Patent of the United States, is:

1. In combination, a support, commutator bars arranged thereon, a ring for securing the bars in fixed relation to the support, and electrical connections between said ring and one or more of the bars, the ends of the bar or bars to which connections are made being widened to facilitate such connection and adjacent bars being shortened.

2. In combination, a cylindrical support, commutator bars arranged thereon, a ring for securing the bars in fixed relation to the support, and electrical connections between said ring and one or more of said bars, portions of the bars to which connections are made being enlarged to facilitate such connection.

3. In combination, a support, commutator bars arranged thereon, a ring for securing the bars in fixed relation to the support, and electrical connections between said ring and one or more of the bars, the end of the bar or bars to which connection is made being widened to facilitate such connection.

4. In combination, a metallic cylindrical support, a cylindrical layer of insulating material surrounding said support, commutator bars arranged about said support, a ring for securing the bars in fixed relation to said support, and strips of insulating material between adjacent commutator bars, said strips projecting beyond the ends of said bars and serving to hold the end of the cylindrical insulating material against the support.

5. In combination, a cylindrical support, commutator bars arranged about said support and separated therefrom by a layer of insulating material, said layer of insulating material projecting beyond the inner edges of the commutator bars, a metal ring for securing the bars in fixed relation to said support, and strips of insulating material arranged between adjacent commutator bars, said strips projecting beyond the ends of the commutator bars and serving to hold the projecting ends of the layer of insulating material against the cylindrical support.

6. In combination, a cylindrical support, a layer of insulating material surrounding said support, commutator bars, the ends of which are undercut arranged about said support, a metal ring for securing the bars in fixed relation to said support, and insulating material between adjacent commutator bars extending beyond said undercut ends to hold said layer of insulating material against the support.

7. In combination, a cylindrical support, a layer of insulating material surrounding said support, commutator bars arranged about said support, a ring for securing the bars in fixed relation to said support, strips of insulating material between adjacent commutator bars, said strips projecting beyond the ends of said bars and serving to hold the end of said layer of insulating material against the support, and insulating material filling the spaces between the projecting ends of said strips.

8. In combination, a cylindrical support, a layer of insulating material surrounding said support, commutator bars arranged about said support, the ends of said bars being undercut, a ring for securing the bars in fixed relation to said support, insulating material between adjacent commutator bars extending beyond said undercut ends to hold said layer of insulating material against the support, and insulating material filling the spaces between the projecting ends of said insulating material between the commutator bars.

In witness whereof I have hereunto set my hand this 16th day of December, 1904.

WILLIAM F. DAWSON.

Witnesses:
BENJAMIN B. HULL,
HELEN ORFORD.